United States Patent
Wu et al.

(10) Patent No.: US 11,598,563 B2
(45) Date of Patent: Mar. 7, 2023

(54) NANO-SEPARATION REFRIGERATION SYSTEM AND METHOD FOR REFRIGERATION CIRCULATION

(71) Applicant: WUYI University, Guangdong (CN)

(72) Inventors: Min Wu, Guangdong (CN); Yijia Wu, Guangdong (CN); Ji Wu, Guangdong (CN); Shuo Chen, Guangdong (CN)

(73) Assignee: WUYI University, Guangdong (CN)

( * ) Notice: Subject to any disclaimer, the term of this patent is extended or adjusted under 35 U.S.C. 154(b) by 147 days.

(21) Appl. No.: 17/359,016

(22) Filed: Jun. 25, 2021

(65) Prior Publication Data

US 2022/0381492 A1 Dec. 1, 2022

(30) Foreign Application Priority Data

May 27, 2021 (CN) .......................... 202110583113.9

(51) Int. Cl.
  *F25B 43/04* (2006.01)
  *B01D 71/02* (2006.01)
  *F25B 39/00* (2006.01)

(52) U.S. Cl.
  CPC .......... *F25B 43/043* (2013.01); *B01D 71/028* (2013.01); *F25B 39/00* (2013.01); *F25B 2339/047* (2013.01); *F25B 2400/23* (2013.01)

(58) Field of Classification Search
  CPC ........ F25B 43/043; F25B 43/00; F25B 39/00; F25B 39/04; F25B 2339/047; F25B 2339/0441; F25B 2400/23; F25B 9/12; B01D 71/028; F25D 17/00; F25D 17/042; F25D 17/065; F25D 29/001
  See application file for complete search history.

(56) References Cited

U.S. PATENT DOCUMENTS

2007/0113581 A1* 5/2007 Yoshimi ................ F25B 43/043
  62/512

* cited by examiner

*Primary Examiner* — Henry T Crenshaw
*Assistant Examiner* — Kamran Tavakoldavani
(74) *Attorney, Agent, or Firm* — Farjami & Farjami LLP

(57) ABSTRACT

The present disclosure discloses a nano-separation refrigeration system and discloses a refrigeration circulation method, wherein the nano-separation refrigeration system includes an evaporator provided with an inlet and an outlet; a condenser provided with a condensation cavity, a gas inlet, a gas outlet, and a liquid outlet, wherein a molecular sieve membrane is disposed in the condensation cavity between the gas inlet and the gas outlet, and the molecular sieve membrane is configured to separate a mixed gas; a first connecting pipe having one end connected to the outlet and the other end to the gas inlet; a second connecting pipe having one end connected to the liquid outlet and the other end to the inlet; a third connecting pipe having one end connected to the gas outlet and the other end to the inlet.

10 Claims, 1 Drawing Sheet

NANO-SEPARATION REFRIGERATION SYSTEM AND METHOD FOR REFRIGERATION CIRCULATION

CROSS-REFERENCE TO RELATED APPLICATIONS

This application is based on and claims the benefit of priority from Chinese Patent Application No. 202110583113.9, filed on 27 May 2021, the entirety of which is incorporated by reference herein.

TECHNICAL FIELD

The present disclosure relates to the field of refrigeration technologies, and in particular, to a nano-separation refrigeration system and a refrigeration circulation method.

BACKGROUND

The traditional refrigeration process adopts a compressor for compression to realize condensation of a freezing medium or adopts liquid to absorb a freezing medium, and the energy consumption of the two modes is very high.

SUMMARY

Several embodiments of the present disclosure provide a nano-separation refrigeration system capable of refrigerating with lower power consumption.

The present disclosure further provides a refrigeration circulation method capable of refrigerating with lower power consumption.

The nano-separation refrigeration system according to an embodiment of a first aspect of the present disclosure includes an evaporator provided with an inlet and an outlet;

a condenser provided with a condensation cavity, a gas inlet, a gas outlet, and a liquid outlet, wherein a molecular sieve membrane is disposed in the condensation cavity between the gas inlet and the gas outlet, and the molecular sieve membrane is configured to separate a mixed gas;

a first connecting pipe having one end connected to the outlet and the other end to the gas inlet;

a second connecting pipe having one end connected to the liquid outlet and the other end to the inlet;

a third connecting pipe having one end connected to the gas outlet and the other end to the inlet; and a blower device communicated with the first connecting pipe and configured to introduce the mixed gas into the condensation cavity.

The nano-separation refrigeration system according to the embodiment of the present disclosure at least has the following beneficial effects. The liquid refrigerant and the depressurization gas are mixed by the evaporator, and the surface pressure of the liquid refrigerant is reduced, so that the liquid refrigerant generates vapor and undergoes a new dynamic balance process to realize the evaporation of the refrigerant. The refrigerant and the depressurization gas are separated by the molecular sieve membrane, and the refrigerant is condensed after reaching a certain concentration to form the liquid refrigerant, and enters the evaporator again for refrigeration. The nano-separation refrigeration system changes a traditional refrigeration circulation mode, and energy consumption in a condensing process is lower, thus reducing a production cost of the refrigeration system and having great economic benefits.

According to some embodiments of the present disclosure, the blower device includes a ventilator.

According to some embodiments of the present disclosure, the second connecting pipe includes a liquid storage section including a plurality of U-shaped pipes.

According to some embodiments of the present disclosure, the refrigeration system further includes a heat dissipation device configured to dissipate heat from the condenser.

According to some embodiments of the present disclosure, the heat dissipation device includes a cooling water pipe wound around the outside of the condenser.

According to some embodiments of the present disclosure, a water inlet of the cooling water pipe is higher than a water outlet of the cooling water pipe.

According to some embodiments of the present disclosure, the gas outlet is located in an upper part of the condenser, the liquid outlet is located in a lower part of the condenser, and the gas inlet is located in a middle of the condenser.

According to some embodiments of the present disclosure, the condenser includes a conical guiding part, and the gas outlet is located at a small end of the conical guiding part.

According to some embodiments of the present disclosure, a port of the third connecting pipe stretches into the second connecting pipe and protrudes beyond an inner wall of the second connecting pipe.

The refrigeration circulation method according to an embodiment of a second aspect of the present disclosure is applied in a refrigeration system, the refrigeration system includes an evaporator, a condenser, and a blower device, the condenser is provided with a condensation cavity, a gas inlet, a gas outlet, and a liquid outlet, a molecular sieve membrane is disposed in the condensation cavity between the gas inlet and the gas outlet; the blower device is configured to introduce a mixed gas into the condensation cavity from the gas inlet; and the refrigeration circulation method includes the following steps of:

filling a mixed gas composed of a refrigerant and a depressurization gas into the refrigeration system, wherein the depressurization gas comprises at least one of hydrogen or helium;

maintaining a system pressure of the refrigeration system greater than a saturation pressure corresponding to the refrigerant at a preset temperature T, wherein a range of the preset temperature T is 35° C.≤T≤60° C.;

allowing the mixed gas composed of the refrigerant and the depressurization gas to enter the condenser, allowing the depressurization gas to pass through the molecular sieve membrane and flow out from the gas outlet to enter the evaporator, allowing a partial pressure of the gaseous refrigerant in the condenser to reach a saturation pressure, and starting to condense the gaseous refrigerant into a liquid refrigerant; and allowing the liquid refrigerant to flow out from the liquid outlet and enter the evaporator to be mixed with the depressurization gas, evaporating the liquid refrigerant into the gaseous refrigerant, and allowing the mixed gas of the refrigerant and the depressurization gas to enter the condenser again under an action of the blower device.

The refrigeration circulation method according to the embodiment of the present disclosure at least has the following beneficial effects. The liquid refrigerant and the depressurization gas are mixed by the evaporator, and the surface pressure of the liquid refrigerant is reduced, so that the liquid refrigerant generates vapor and undergoes a new dynamic balance process to realize the evaporation of the refrigerant. The refrigerant and the depressurization gas are separated by the molecular sieve membrane, and the refrigerant is condensed after reaching a certain concentration to form the liquid refrigerant, and enters the evaporator again for refrigeration. The nano-separation refrigeration system changes a traditional refrigeration circulation mode, and energy consumption in a condensing process is lower, thus reducing a production cost of the refrigeration system and having great economic benefits.

Part of the additional aspects and advantages of the present disclosure will be given in part in the following description, and will become apparent in part from the following description, or will be learned through the practice of the present disclosure.

BRIEF DESCRIPTION OF THE DRAWINGS

The present disclosure will be further described below with reference to the accompanying drawings and embodiments, in which.

Figure 1:
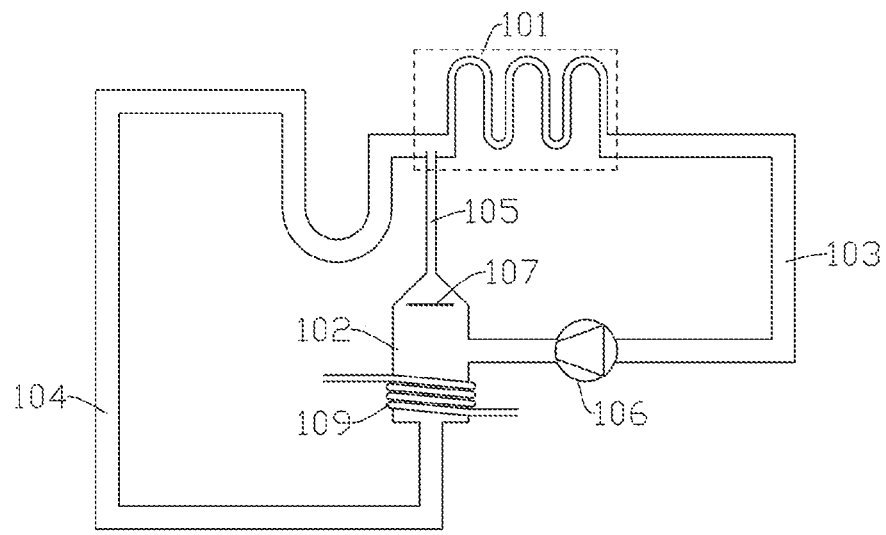
FIG. 1 is a schematic diagram of a nano-separation refrigeration system of an embodiment of the present disclosure.

REFERENCE NUMERALS 101 refers to evaporator; 102 refers to condenser; 103 refers to first connecting pipe; 104 refers to second connecting pipe; 105 refers to third connecting pipe; 106 refers to blower device; 107 refers to molecular sieve membrane; 108 refers to liquid storage section; and 109 refers to heat dissipation device.

DETAILED DESCRIPTION

The embodiments of the present disclosure will be described in detail hereinafter. Examples of the embodiments are shown in the accompanying drawings. The same or similar reference numerals throughout the drawings denote the same or similar elements or elements having the same or similar functions. The embodiments described below with reference to the accompanying drawings are exemplary and are only intended to explain the present disclosure, but should not be construed as limiting the present disclosure.

In the description of the present disclosure, it shall be understood that the orientation or position relation related to the orientation description, such as the orientation or position relation indicated by the upper, lower, front, rear, left, right, etc., is based on the orientation or position relation shown in the drawings, which is only configured to convenience of description of the present disclosure and simplification of description instead of indicating or implying that the indicated device or element must have a specific orientation, and be constructed and operated in a specific orientation, and thus shall not be understood as a limitation to the present disclosure.

In the description of the present disclosure, the meaning of several refers to be one or more, and the meaning of multiple refers to be more than two. The meanings of greater than, less than, more than, etc., are understood as not including this number, while the meanings of above, below, within, etc., are understood as including this number. If there is a description to the first and second, it is only for the purpose of distinguishing technical features, and shall not be understood as indicating or implying relative importance, implicitly indicating the number of the indicated technical features or implicitly indicating the order of the indicated technical features.

In the description of the present disclosure, unless otherwise clearly defined, words such as setting, installation, connection, etc., shall be understood broadly, and those skilled the art can reasonably determine the specific meanings of the above words in the present disclosure in combination with the specific contents of the technical solution.

With reference to FIG. 1, a nano-separation refrigeration system according to an embodiment of a first aspect of the present disclosure includes an evaporator 101, a condenser 102, a first connecting pipe 103, a second connecting pipe 104, a third connecting pipe 105 and a blower device 106. The evaporator 101 is provided with an inlet and an outlet. The condenser 102 is provided with a condensation cavity, a gas inlet, a gas outlet and a liquid outlet. A molecular sieve membrane 107 is disposed in the condensation cavity between the gas inlet and the gas outlet and is configured to separate a mixed gas. One end of the first connecting pipe 103 is connected to the outlet, and the other end of the first connecting pipe 103 is connected to the gas inlet. One end of the second connecting pipe 104 is connected to the liquid outlet, and the other end of the second connecting pipe 104 is connected to the inlet. One end of the third connecting pipe 105 is connected to the gas outlet, and the other end of the third connecting pipe 105 is connected to the inlet. The blower device 106 is communicated with the first connecting pipe 103 and is configured to introduce the mixed gas into the condensation cavity.

A refrigerant and a depressurization gas are injected into the nano-separation refrigeration system, and refrigeration circulation is achieved through circulation conversion between a gas state and a liquid state of the refrigerant.

Specifically, the liquid refrigerant and the depressurization gas are mixed in the evaporator 101. The evaporator 101 provides a space for evaporation in a position where the liquid refrigerant and the depressurization gas start to mix, and there is no gas refrigerant in this position, that is, the partial pressure of the gas refrigerant is zero, and therefore the liquid refrigerant is necessarily evaporated to form the gas refrigerant. In this process, the evaporator 101 absorbs heat in the air to effect refrigeration.

The gas refrigerant and the depressurization gas are mixed in the evaporator 101 to form a mixed gas, and the mixed gas flows into the condenser 102 along a system. The blower device 106 is configured to introduce the mixed gas into the condensation cavity of the condenser 102. The molecular sieve membrane 107 is disposed in the condensation cavity. The molecular sieve membrane 107 is defined as a novel membrane material capable of realizing molecular sieving, which has a uniform pore diameter equivalent to the molecular size, ion exchange performance, high-temperature thermal stability and excellent shape-selective catalytic performance, is easy to modify, and has various different types and different structures for selection. The molecular sieve membrane 107 is configured to allow the passage of the depressurization gas while preventing the passage of the refrigerant, thereby achieving the effect of separating the mixed gas.

For example, the refrigerant is selected to be ammonia, and the depressurization gas is selected to be hydrogen or helium. The hydrogen has a molecular diameter of 0.289 nm, i.e., 2.89 A. The helium has a molecular diameter of 0.26 nm, that is, 2.6 A. The ammonia has a molecular diameter of 0.444 nm, that is, 4.44 A. Therefore, hydrogen and ammonia can be effectively separated, or helium and ammonia can be effectively separated by selecting the molecular sieve membrane 107 of 3 A or 4 A.

The nature of liquefaction of the gas refrigerant is that the gas refrigerant is necessarily liquefied after the relative humidity of the gas refrigerant reaches 100%. Thus, after the mixed gas is separated, only the gas refrigerant remains in a part of space of the condensation cavity, or both the gas refrigerant and the liquid refrigerant exist. When the mixed gas is continuously introduced into the condensation cavity of the condenser 102 by the blower device 106, the gas refrigerant is condensed into the liquid refrigerant after the relative humidity of the gas refrigerant reaches 100%.

Microscopically, evaporation is the process of liquid molecules leaving the liquid surface. As molecules in the liquid are moving irregularly and continuously, the average kinetic energy of the molecules is matched with the temperature of the liquid. Due to the irregular motion and mutual collisions of the molecules, there are always molecules having kinetic energy greater than the average kinetic energy at any moment. These molecules with sufficiently large kinetic energy, such as those located near the liquid surface, can break away from the liquid surface and fly out to become vapor of the liquid when their kinetic energy is greater than the work required to overcome the attraction between the molecules in the liquid when flying out, which is an evaporation phenomenon. The flying-out molecules may return to the liquid surface or enter the interior of the liquid after colliding with other molecules. If more molecules fly out than back, the liquid evaporates. The more molecules in the space, the more molecules fly back. When the flying-out molecules are equal to the flying-back molecules, the liquid is in a saturated state, and the pressure at this time is called the saturation pressure Pt of the liquid at that temperature. At this time, if the number of gas molecules of the substance in the space is artificially increased, the flying-back molecules will be more than the flying-out molecules, and condensation will occur.

A working process of the nano-separation refrigeration system according to the embodiment of the first aspect of the present disclosure is described by taking the ammonia being the refrigerant and the hydrogen being the depressurization gas as examples.

A mixed gas of ammonia and hydrogen is introduced into the condensation cavity from a gas inlet of the condenser 102 under the action of the blower device 106. The hydrogen passes through the molecular sieve membrane 107 and flows out of the gas outlet. The ammonia is blocked by the molecular sieve membrane 107 and accumulates in the condensation cavity. When the concentration of the Ammonia is constantly increased, according to the h-s diagram (pressure enthalpy diagram) of the ammonia, the saturation pressure Pt of the ammonia is 15 bar at 40° C., and a standby pressure of the nano-separation refrigeration system is set to be 2 Pt, that is, 30 bar, so that the concentration of the ammonia in the condenser 102 is continuously increased. When the concentration reaches 50%, that is, the partial pressure of the ammonia reaches 1 Pt, the ammonia starts to condense to form liquid ammonia. The liquid ammonia flows out of the liquid outlet. The liquid ammonia enters the evaporator 101 along the second connecting pipe 104, the hydrogen enters the evaporator 101 along the third connecting pipe 105, and the liquid ammonia and the hydrogen are mixed in the evaporator 101. In the evaporator 101, because the hydrogen is light and fills the evaporator 101, the partial pressure of the liquid ammonia is close to 0, so that the liquid ammonia will have molecules entering the hydrogen to form ammonia, i.e., the liquid ammonia will evaporate. The ammonia and the hydrogen are mixed and then enter the condenser 102 along the first connecting pipe 103 to realize circulation.

The liquid refrigerant and the depressurization gas are mixed by the evaporator 101, and the surface pressure of the liquid refrigerant is reduced, so that the liquid refrigerant generates vapor and undergoes a new dynamic balance process to realize the evaporation of the refrigerant. The refrigerant and the depressurization gas are separated by the molecular sieve membrane 107, and the refrigerant is condensed after reaching a certain concentration to form the liquid refrigerant, and enters the evaporator 101 again for refrigeration. The nano-separation refrigeration system changes a traditional refrigeration circulation mode, and energy consumption in a condensing process is lower, thus reducing a production cost of the refrigeration system and having great economic benefits.

Figure 2:
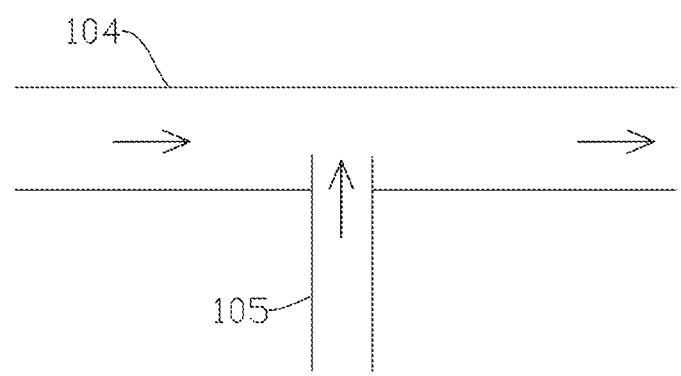
FIG. 2 is a schematic diagram of connection between a third connecting pipe and a second connecting pipe shown in FIG. 1.

With reference to FIG. 2, in some embodiments, a port of the third connecting pipe 105 stretches into the second connecting pipe 104 and protrudes beyond an inner wall of the second connecting pipe 104. Liquid ammonia enters from the left side, hydrogen enters from the lower side, and the port of the third connecting pipe 105 protrudes beyond the inner wall of the second connecting pipe 104, so that the possibility that the liquid ammonia flows backwards into the condenser 102 from the third connecting pipe 105 can be reduced.

According to some embodiments of the present disclosure, the second connecting pipe 104 includes a liquid storage section 108, and the liquid storage section 108 includes a plurality of U-shaped pipes. By disposing the U-shaped pipes, more refrigerant can be stored, and a space occupied by the second connecting pipe 104 is reduced.

According to some embodiments of the present disclosure, the refrigeration system further includes a heat dissipation device 109 configured to dissipate heat from the condenser 102. By disposing the heat dissipation device 109, the heat dissipation efficiency of the condenser 102 can be effectively improved, and then the condensation efficiency is improved.

According to some embodiments of the present disclosure, the heat dissipation device 109 includes a cooling water pipe wound around the outside of the condenser 102. The cooling water pipe may utilize a normal-temperature water source which is easily available. It will be understood the heat dissipation device 109 may also employ an air-cooled device instead of a cooling water pipe, or the air-cooled device is configured in combination with the cooling water pipe.

According to some embodiments of the present disclosure, an inlet of the cooling water pipe is higher than an outlet of the cooling water pipe, so that water flow is facilitated, the flow rate is increased, and heat exchange is accelerated.

According to some embodiments of the present disclosure, the gas outlet is located in an upper part of the condenser 102, the liquid outlet is located in a lower part of the condenser 102, and the gas inlet is located in the middle of the condenser 102. The depressurization gas is lighter than the refrigerant and flows upwards, and the gas outlet is located in the upper part of the condenser 102 to facilitate outflow of the depressurization gas. The liquid outlet is located in the lower part of the condenser 102 to facilitate the outflow of the liquefied refrigerant.

According to some embodiments of the present disclosure, the condenser 102 includes a conical guiding part. The gas outlet is located at a small end of the conical guiding part. By disposing the conical guiding part, the depressurization gas is guided to flow out of the gas outlet, and flow loss is reduced.

According to some embodiments of the present disclosure, the blower device 106 includes a ventilator. The ventilator does not need to have a compression ratio as large as that of a compressor of a conventional refrigeration system. The ventilator only needs to introduce the mixed gas into the condenser 102, and condensation is achieved by the change of the concentration of the refrigerant itself. Certainly, the blower device 106 may also be a compressor which may have a power less than that of conventional compressors.

A refrigeration circulation method according to an embodiment of a second aspect of the present disclosure is applied in a refrigeration system. The refrigeration system includes an evaporator 101, a condenser 102, and a blower device 106, the condenser 102 is provided with a condensation cavity, a gas inlet, a gas outlet, and a liquid outlet, a molecular sieve membrane 107 is disposed in the condensation cavity between the gas inlet and the gas outlet. The blower device 106 is configured to introduce a mixed gas into the condensation cavity from the gas inlet. The refrigeration circulation method includes the following steps of:

filling a mixed gas composed of a refrigerant and a depressurization gas into the refrigeration system, wherein the depressurization gas comprises at least one of hydrogen or helium;

maintaining a system pressure of the refrigeration system greater than a saturation pressure corresponding to the refrigerant at a preset temperature T, wherein a range of the preset temperature T is $35° C. \leq T \leq 60° C.$;

allowing the mixed gas composed of the refrigerant and the depressurization gas to enter the condenser 102, allowing the depressurization gas to pass through the molecular sieve membrane 107 and flow out from the gas outlet to enter the evaporator 101, allowing a partial pressure of the gaseous refrigerant in the condenser 102 to reach a saturation pressure, and starting to condense the gaseous refrigerant into a liquid refrigerant; and allowing the liquid refrigerant to flow out from the liquid outlet and enter the evaporator 101 to be mixed with the depressurization gas, evaporating the liquid refrigerant into the gaseous refrigerant, and allowing the mixed gas of the refrigerant and the depressurization gas to enter the condenser 102 again under an action of the blower device.

The higher the preset temperature is, the higher the required system pressure is, while the lower the preset temperature T is, the higher the heat dissipation requirement of the condenser 102 is, both of which can increase a manufacturing cost. After verification by many tests on the present disclosure, it is found that when a range of the preset temperature is $35° C. \leq T \leq 60° C.$, the system pressure and the heat dissipating requirement can be balanced, thereby effectively reducing a cost.

The refrigeration circulation method according to the embodiment of the present disclosure at least has the following beneficial effects. The liquid refrigerant and the depressurization gas are mixed by the evaporator 101, and the surface pressure of the liquid refrigerant is reduced, so that the liquid refrigerant generates vapor and undergoes a new dynamic balance process to realize the evaporation of the refrigerant. The refrigerant and the depressurization gas are separated by the molecular sieve membrane 107, and the refrigerant is condensed after reaching a certain concentration to form the liquid refrigerant, and enters the evaporator 101 again for refrigeration. The nano-separation refrigeration system changes a traditional refrigeration circulation mode, and energy consumption in a condensing process is lower, thus reducing a production cost of the refrigeration system and having great economic benefits.

The embodiments of the present disclosure are described in detail with reference to the drawings above, but the present disclosure is not limited to the above embodiments, and various changes may also be made within the knowledge scope of those of ordinary skills in the art without departing from the purpose of the present disclosure.

We claim:

1. A nano-separation refrigeration system, comprising:
   an evaporator provided with an inlet and an outlet;
   a condenser provided with a condensation cavity, a gas inlet, a gas outlet, and a liquid outlet, wherein a molecular sieve membrane is disposed in the condensation cavity between the gas inlet and the gas outlet, and the molecular sieve membrane is configured to separate a mixed gas;
   a first connecting pipe having one end connected to the outlet and the other end to the gas inlet;
   a second connecting pipe having one end connected to the liquid outlet and the other end to the inlet;
   a third connecting pipe having one end connected to the gas outlet and the other end to the inlet; and
   a blower device communicated with the first connecting pipe and configured to introduce the mixed gas into the condensation cavity.

2. The nano-separation refrigeration system according to claim 1, wherein the blower device comprises a ventilator.

3. The nano-separation refrigeration system according to claim 1, wherein the second connecting pipe comprises a liquid storage section comprising a plurality of U-shaped pipes.

4. The nano-separation refrigeration system according to claim 1, wherein the refrigeration system further comprises a heat dissipation device configured to dissipate heat from the condenser.

5. The nano-separation refrigeration system according to claim 4, wherein the heat dissipation device comprises a cooling water pipe wound around the outside of the condenser.

6. The nano-separation refrigeration system according to claim 5, wherein a water inlet of the cooling water pipe is higher than a water outlet of the cooling water pipe.

7. The nano-separation refrigeration system according to claim 1, wherein the gas outlet is located in an upper part of the condenser, the liquid outlet is located in a lower part of the condenser, and the gas inlet is located in a middle of the condenser.

8. The nano-separation refrigeration system according to claim 1, wherein the condenser comprises a conical guiding part, and the gas outlet is located at a small end of the conical guiding part.

9. The nano-separation refrigeration system according to claim 1, wherein a port of the third connecting pipe stretches into the second connecting pipe and protrudes beyond an inner wall of the second connecting pipe.

10. A refrigeration circulation method applied in a refrigeration system, wherein the refrigeration system comprises an evaporator, a condenser, and a blower device, the condenser is provided with a condensation cavity, a gas inlet, a gas outlet, and a liquid outlet, a molecular sieve membrane is disposed in the condensation cavity between the gas inlet and the gas outlet; the blower device is configured to introduce a mixed gas into the condensation cavity from the gas inlet; and the refrigeration circulation method comprises the following steps of:

filling a mixed gas composed of a refrigerant and a depressurization gas into the refrigeration system, wherein the depressurization gas comprises at least one of hydrogen or helium;

maintaining a system pressure of the refrigeration system greater than a saturation pressure corresponding to the refrigerant at a preset temperature T, wherein a range of the preset temperature T is $35°\ C. \leq T \leq 60°\ C.$;

allowing the mixed gas composed of the refrigerant and the depressurization gas to enter the condenser, allowing the depressurization gas to pass through the molecular sieve membrane and flow out from the gas outlet to enter the evaporator, allowing a partial pressure of the gaseous refrigerant in the condenser to reach a saturation pressure, and starting to condense the gaseous refrigerant into a liquid refrigerant; and allowing the liquid refrigerant to flow out from the liquid outlet and enter the evaporator to be mixed with the depressurization gas, evaporating the liquid refrigerant into the gaseous refrigerant, and allowing the mixed gas of the refrigerant and the depressurization gas to enter the condenser again under an action of the blower device.

\* \* \* \* \*